United States Patent
Shynar et al.

(10) Patent No.: US 8,938,358 B1
(45) Date of Patent: Jan. 20, 2015

(54) SYSTEM AND METHOD FOR SUGGESTING ALTERNATIVE TRAVEL DESTINATIONS

(71) Applicant: Google Inc., Mountain View, CA (US)

(72) Inventors: Michael Shynar, Kiryat Ono (IL); Asaf Zomet, Jerusalem (IL)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/868,485

(22) Filed: Apr. 23, 2013

(51) Int. Cl.
G01C 21/34 (2006.01)

(52) U.S. Cl.
CPC .................................... G01C 21/34 (2013.01)
USPC ........................................................ 701/533

(58) Field of Classification Search
USPC ......... 701/533, 467, 540, 209, 424, 425, 426, 701/430, 438, 439, 441
See application file for complete search history.

(56) References Cited

U.S. PATENT DOCUMENTS

| | | | |
|---|---|---|---|
| 6,996,469 B2 | 2/2006 | Lau et al. | |
| 2008/0027639 A1 | 1/2008 | Tryon | |
| 2010/0168996 A1* | 7/2010 | Bourque et al. | 701/200 |
| 2011/0063132 A1 | 3/2011 | Trum | |
| 2011/0313967 A1* | 12/2011 | Zafar et al. | 706/52 |
| 2012/0001741 A1 | 1/2012 | Watanabe | |
| 2012/0215641 A1 | 8/2012 | Ohki | |
| 2012/0253660 A1 | 10/2012 | Dillahunt et al. | |
| 2012/0265433 A1* | 10/2012 | Viola et al. | 701/410 |
| 2013/0166197 A1* | 6/2013 | Tseng et al. | 701/426 |

* cited by examiner

*Primary Examiner* — Mary Cheung
*Assistant Examiner* — Rodney Butler
(74) *Attorney, Agent, or Firm* — Dority & Manning, P.A.

(57) ABSTRACT

A system and method for suggesting alternative travel destinations is disclosed. In one embodiment, the method may generally include receiving, at a computing device, a query from a client device associated with a requested travel destination. The requested travel destination may be at a first geographic location. The method may also include analyzing travel pattern data for at least one user that previously requested travel directions to the requested travel destination to identify at least one second geographic location that is associated with the requested travel destination. The travel pattern data may include information associated with a location of the at least one user after requesting the travel directions. In addition, the method may include transmitting to the client device a suggestion for at least one alternative travel destination based on the at least one second geographic location.

20 Claims, 4 Drawing Sheets

SYSTEM AND METHOD FOR SUGGESTING ALTERNATIVE TRAVEL DESTINATIONS

FIELD

The present subject matter relates generally to the use of computer-based mapping systems for generating and/or receiving driving directions to requested travel destinations and, more particularly, to a system and method for suggesting alternative travel destinations to a user of a computer-based mapping system.

BACKGROUND

It is well-known to use computer-based mapping systems to provide travel directions to users. For example, Google Maps for Mobile allows mobile devices, such as smart phones, tablets, and PDAs, to display maps and directions in response to user requests. Specifically, a user may request travel directions by inputting an origin (e.g., the user's current location) and a desired travel destination into his/her mobile device. The device may then receive and/or generate suggested routing information based on the origin and destination information and provide such routing information to the user, such as by mapping the suggested route onto a display screen of the device.

It is often the case that a user of a computer-based mapping system desires to travel to a certain destination but actually issues a query related to a different destination. For example, a user may issue a query for a particular sports arena when in fact the user actually intends to travel to a parking lot or parking garage near the sports arena. In such instance, the user will typically request driving directions to the sports arena and thereafter deviate from the suggested route so arrive at the parking lot/garage. By suggesting alternative travel destinations in response to queries for specific travel destinations that are more closely linked to a user's actual intent, it is believed that a more enjoyable and satisfying user experience may be obtained.

SUMMARY

Aspects and advantages of the invention will be set forth in part in the following description, or may be obvious from the description, or may be learned through practice of the invention.

In one aspect, the present subject matter is directed to a computer implemented method for suggesting alternative travel destinations. The method may include receiving, at a computing device, a query from a client device associated with a requested travel destination. The requested travel destination may be at a first geographic location. The method may also include analyzing travel pattern data for at least one user that previously requested travel directions to the requested travel destination to identify at least one second geographic location that is associated with the requested travel destination. The travel pattern data may include information associated with a location of the at least one user after requesting the travel directions. In addition, the method may include transmitting to the client device a suggestion for at least one alternative travel destination based on the at least one second geographic location.

In another aspect, the present subject matter is directed to a system for suggesting alternative travel destinations. The system may include a computing device including a processor and memory. The memory may store instructions that, when executed by the processor, configure the computing device to receive a query from a client device associated with a requested travel destination. The requested travel destination may be at a first geographic location. The computing device may also be configured to analyze travel pattern data for at least one user that previously requested travel directions to the requested travel destination to identify at least one second geographic location that is associated with the requested travel destination. The travel pattern data may include information associated with a location of the at least one user after requesting the travel directions. In addition, the computing device may be configured to transmit to the client device a suggestion for at least one alternative travel destination based on the at least one second geographic location.

Other exemplary aspects of the present subject matter are directed to apparatus, computer-readable media, devices and other systems and/or methods for suggestion alternative travel destinations.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for suggesting alternative travel destinations to a user of a computer-based mapping system (e.g., Google Maps for Mobile). Specifically, in several embodiments, travel pattern data may be collected from a plurality of users of the mapping system (e.g., using known crowdsourcing methodologies). The travel pattern data may include, for example, location information associated with the travel patterns of the users after requesting driving directions to a given travel destination. For instance, after receiving a request from a user for directions to a particular travel destination, data regarding the user's movement may be collected and analyzed to determine if the user actually traveled to the requested destination or to a completely different destination. As indicated above, users will often request driving directions to one destination when they actually intend to travel to a different destination. Thus, by aggregating travel pattern data from a plurality of users that requested driving directions to the same travel destination, one or more alternative destinations may be identified as being associated with the requested travel destination. Thereafter, when another user enters a query related to the same travel destination (e.g., a search query or a query for driving directions), the identified destination(s) may be suggested to the user as a potential alternative(s) to receiving query results for the requested travel direction.

Figure 1:
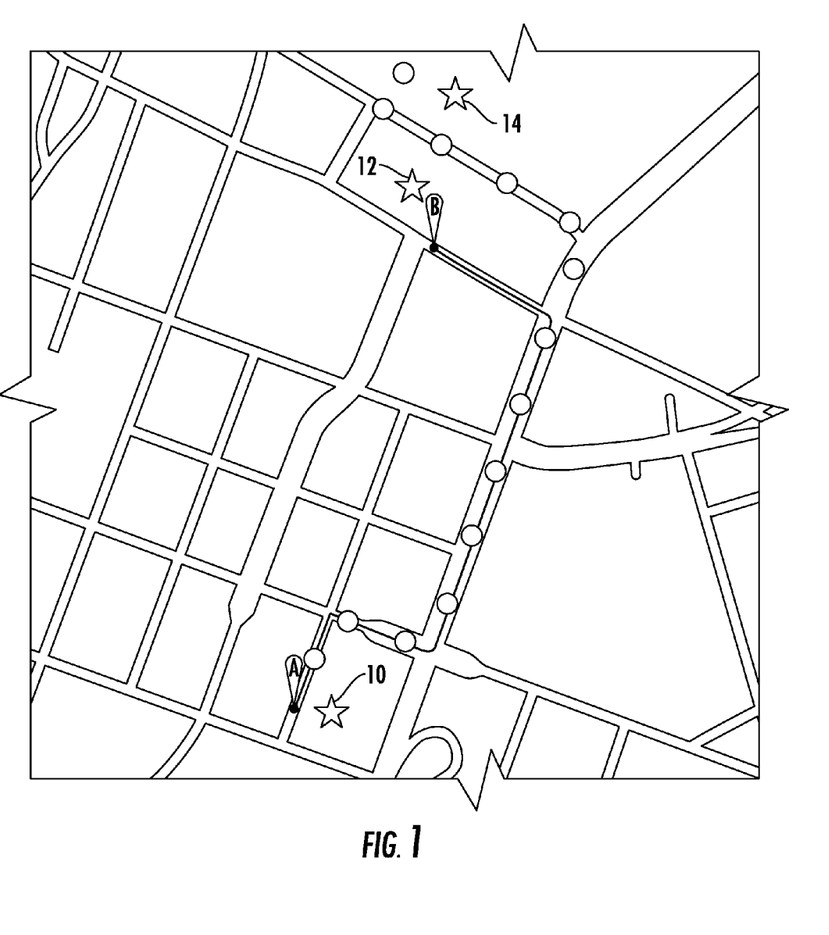
FIG. 1 illustrates a partial map view showing both a suggested driving route for traveling between two locations and an actual travel route taken by the user that requested such driving route.

Referring now to the drawings, FIG. 1 illustrates a partial map view showing a suggested driving route for traveling between two locations (indicated by the solid line extending between points A and B) and an actual travel route taken by the user that requested such driving route (indicated by the circles). As is generally understood, a user may request travel or driving directions by inputting an origin (e.g., the user's current location) and a travel destination into a suitable computing device (e.g., a location-enabled navigation device). The computing device may then receive and/or generate suggested routing information based on the origin and destination information and provide the routing information to the user (e.g., by mapping the suggested route onto a display screen of the device and/or by providing audible cues for navigating along the route). For example, as shown in FIG. 1, a suggested route may be displayed in response to a user's request for driving directions from his/her current location 10 to a nearby travel destination 12. The user may then, if desired, travel along the suggested route to the requested travel destination 12.

However, it is often the case that, after requesting driving directions to a specific destination, a user may actually travel to a different destination. For example, as shown in FIG. 1, instead of traveling to the requested travel destination 12, the user deviated from the suggested route and completed his/her journey at an alternative destination 14. In many instances, this alternative destination 14 may be related to or associated with the requested travel destination 12. For example, in the illustrated embodiment, the requested travel destination 12 may correspond to a particular attraction (e.g., a sports arena, a concert hall, a shopping mall, etc.) and the alternative destination 14 may correspond to a location for parking near the attraction (e.g., a parking lot or parking garage) or a restaurant near the attraction.

As will be described below, by collecting data associated with the actual travel patterns of users requesting driving directions to a given travel destination, alternative travel destinations may be identified for the requested travel destination that correlate highly to the actual travel intentions of the users. Thus, when a user issues a query related to the same travel destination in the future (e.g., a search query or a query requesting driving directions to the destination), the user may be presented with one or more suggestions for alternative travel destinations based on the travel pattern data of previous users. For example, in the illustrated embodiment, when a user issues a query related to travel destination 12, destination 14 may be suggested to the user as a potential alternative travel destination.

Figure 2:
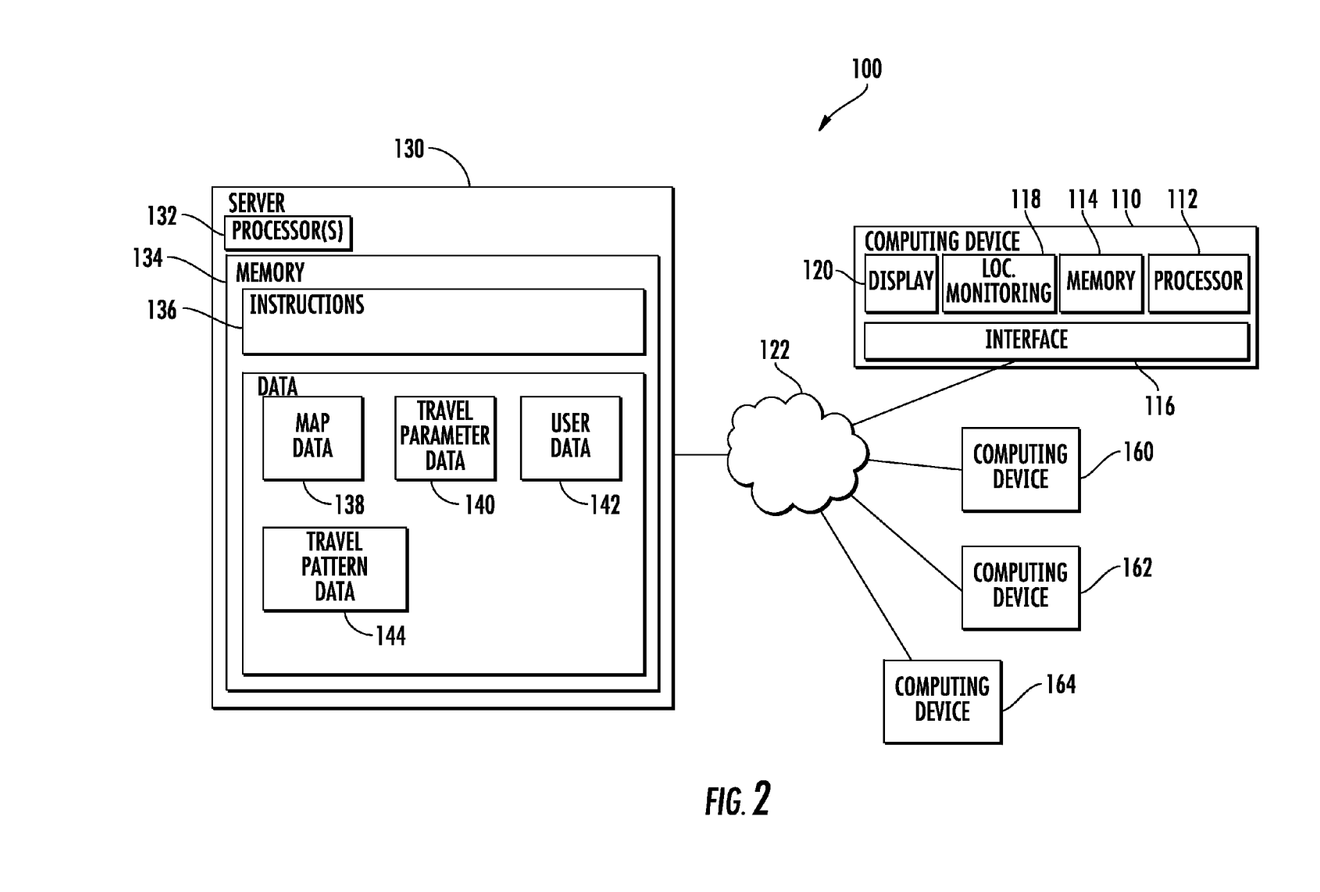
FIG. 2 illustrates a schematic view of one embodiment of a computer-based mapping system for suggesting alternative travel destinations.

Referring now to FIG. 2, a schematic view of one embodiment of a computer-based mapping system 100 for suggesting alternative travel destinations to users of such system is illustrated in accordance with aspects of the present subject matter. As shown, the system 100 includes a computing device 110. In general, the computing device 110 may be any suitable processor-based computing device. In several embodiments, the computing device 110 may be configured as a navigation device capable of providing travel or driving directions to a user. For instance, as indicated above with reference to FIG. 1, a user may request driving directions by inputting origin and destination information into the computing device 110. The computing device 110 may then receive and/or generate routing information based on the origin and destination information and provide the routing information to the user through any suitable output device, such as a display screen 120.

It should be appreciated that, as used herein, a navigation device may be any suitable computing device that is capable of receiving and/or generating routing information based, at least in part, on the location of such device. Thus, suitable navigation devices may include, but are not limited to, various GPS-enabled or other location-enabled devices, such as mobile phones (including smart phones), personal digital assistants, tablets, laptops, personal navigation assistants (PNAs), personal (or portable) navigation devices (PNDs) and/or other suitable computing devices (e.g., computing devices incorporated into and/or forming part of an on-board computer system for a vehicle). For instance, a location-enabled device may be configured to implement a suitable navigation application or client (e.g., Google Maps for Mobile) to allow routing information to be received and/or generated by the device based on its location.

The computing device 110 may include a processor(s) 112 and a memory 114. The processor(s) 112 may be any known processing device. The memory 1114 may include any suitable computer-readable medium or media, including, but not limited to, RAM, ROM, hard drives, flash drives, or other memory devices. The memory 114 may store information accessible by the processor(s) 112, including instructions that can be executed by the processor(s) 112. The instructions can be any set of instructions that when executed by the processor(s) 112, cause the processor(s) 112 to provide desired functionality. For instance, the instructions can be software instructions rendered in a computer-readable form. When software is used, any suitable programming, scripting, or other type of language or combinations of languages may be used to implement the teachings contained herein. Alternatively, the instructions can be implemented by hard-wired logic or other circuitry, including, but not limited to application-specific circuits.

The memory 114 may also include data that may be retrieved, manipulated, or stored by the processor(s) 112. For instance, the memory 114 may store information associated with the travel history of a user of the computing device 100, such as location information associated with the movement of the user after requesting driving directions to a given travel destination. As will be discussed in further detail below, such information may be used as a basis for suggesting alternative travel destinations to users of the system 100.

Additionally, the computing device 110 may include a network interface 116 for accessing information over a network 122. The network 122 may include a combination of networks, such as cellular network, Wi-Fi network, LAN, WAN, the Internet, and/or other suitable network and can include any number of wired or wireless communication links. For instance, computing device 110 may communicate through a cellular network using a WAP standard or other appropriate communication protocol. The cellular network may in turn communicate with the Internet, either directly or through another network.

The computing device 110 may also be location-enabled and, thus, may include a location monitoring component 118 for generating location information for the computing device 110. For instance, the location monitoring component 118 may be a GPS module or sensor configured to determine location information for the computing device 110 based on signals received from one or more satellites. In another embodiment, the location monitoring component 118 may be a location module or sensor configured to determine location information for the computing device 110 based on signals received from one or more cell phone towers. Alternatively, the location monitoring component 118 may be any other suitable module, sensor and/or component that is capable of determining location information for the computing device 110. The location information may include, for example, time-stamped geographic coordinates for the computing device 110, which may, in turn, allow the travel velocity of the computing device 110 to be determined. It should be appreciated that the computing device 110 may communicate the location information over the network 122 or may utilize such information independently for use in providing routing information to the user.

Moreover, the computing device 110 may also be configured to communicate with another computing device 130 over the network 122. In several embodiments, the computing device 130 may be a server, such as a web server, that provides information to a plurality of client computing devices (e.g., computing devices 110, 160, 162, 164) over the network 122. For example, the computing device 130 may receive a request from the computing device 110 and locate information to return to the device 110 that is responsive to the request. The computing device 130 may take any applicable form, and may, for instance, include a system that provides search services, such as the services provided by Google Inc.

Similar to computing device 110, the computing device 130 includes a processor(s) 132 and a memory 134. The memory 134 may, for example, include instructions 136 for receiving navigation-related queries from a client device (e.g., requests for routing information) and for generating a response to the client device based on the query (e.g., by generating a route for presentation to the client device based on routing request information). The memory 134 may also include or be coupled to various databases containing information for presentation to a user and for performing various functions (e.g., for generating routing information and/or for identifying and suggesting alternative travel destinations). For instance, the memory 134 may include a map database 138, a travel parameter database 140, a user information database 142 and a travel pattern database 114. As will be discussed below, the processor(s) 132 may be configured to execute instructions stored in the memory 134 to suggest one or more alternative travel destinations to a user based at least in part on information stored in the travel pattern database 144.

Additionally, the processor(s) 132 may be configured to execute instructions stored in the memory 134 to provide routing information to a user based at least in part on information stored in its various databases. For example, within the computing device 130, processor(s) 132 may compute a route in response to requests from a client device, such as the computing device 110. Once a route has been determined, the computing device 130 may provide such route information to the client device over the network 122. The route information may be provided to the client device in any suitable format. For instance, for mobile devices, the information may be transmitted as an HTML document or other fully-formatted document that will not require significant processing by the device. The information can include HTML code, XML messages, WAP code, Java applets, xhtml, plain text, voiceXML, VoxML, VXML, or any other suitable format, that causes the device to display the suggested route information.

Referring still to FIG. 2, the map database 138 of the computing device 130 may store map-related information, at least a portion of which may be transmitted to or present in a client device, such as the computing device 110. For instance, the map database 138 may store map tiles, where each tile is an image of a particular geographic area. Depending on the resolution (e.g. whether the map is zoomed in or out), a single tile may cover an entire state in relatively little detail or just a few streets in high detail.

The map database 138 may also include points-of-interest. A point-of-interest may be any item that is interesting to one or more users and that is associated with a geographical location. For instance, a point-of-interest may include a landmark, stadium, or building. A point-of-interest may be added to the map database 138 by professional map providers, individual users, or other entities.

The map database 138 may also store street information. In addition to street images in the tiles, the street information can include the location of a street relative to a geographic area or other streets. For instance, the map database 138 may store information indicating whether a user can access one street directly from another street. The street information may further include street names where available, and potentially other information, such as distance between intersections and speed limits. All or some of the foregoing can be used by processor(s) 132 to compute a route between an origin and a requested travel destination.

The travel parameter database 140 of the computing device 130 may store various travel parameters that can be used in the determination of a route from one location to another. For instance, the travel parameter database 140 may include information associated with estimated trip time while traversing a particular street or path between locations. In addition, the travel parameter database 140 may include information associated with average speed over a particular street or traversable path. The travel parameter database 140 may further include traffic information that can be used in the computation of a route. For instance, the travel parameter database 140 may include real-time traffic conditions obtained from, for instance, a traffic service. Moreover, the travel parameter database 14 may include information obtained from public agencies, roadway monitors, traffic cameras, and the like. The information can include real-time information concerning the speed of traffic flow at particular points in a transportation system.

The user information database 142 of the computing device 130 may include information optionally provided by one or more users of the system 100. For instance, a user of the computing device 110 may indicate that the user wishes to share information with computing device 130, such as preferred route information, current location information, historical routes taken by the user, geographic area information, calendar information or other information (e.g., a suggested alternative travel destination(s) for a given travel destination). This information can be used by processor(s) 132 in determining a particular route and/or performing any other the methods described herein.

The travel pattern database 144 of the computing device 130 may store information associated with the travel history of one or more users of the system 100. For example, as indicated above, client devices (e.g., computing devices 110, 160, 162, 164) may include location monitoring components 118 configured to generate location information related to the current location of each device, which may then be transmitted to the computing device 130 via the network 122. Such location information may be used to determine the travel patterns of the various users, such as the specific routes taken by users between two specified locations and the final driving destinations of the users. For example, as described above with reference to FIG. 1, users may often request driving directions to a travel destination located at a first geographic location (e.g., destination 12) but, for a variety of reasons, may actually travel to a travel destination located at a second geographic location (e.g., destination 14). By utilizing the location information transmitted from the client devices, such travel patterns may be identified and stored with the travel pattern database 144. This travel pattern data may then be utilized to suggest one or more alternative travel destinations in response to a user submitting a query related to a given travel destination.

In several embodiments, the travel pattern data may be stored and/or organized within the memory 134 based on a user's requested travel destination. For example, each time a user requests driving directions to a given travel destination, the location information transmitted by the user's device may be collected and stored together with the requested destination. This location information may be used to determine, among other things, when the user has reached his/her final driving destination, which may then be compared to the geographic location of the requested destination. If the geographic location of the user's final driving destination differs from the geographic location of the requested destination, such location may be identified as a potential alternative travel destination for the requested destination. As more and more users request directions to the same travel destination, a significant amount of data may be collected that reflects the actual travel patterns of users traveling to the requested destination. Thus, if the data indicates that users requesting driving directions a given travel destination often complete their journey at a different destination, such destination may be suggested to a user up-front as an alternative travel destination for the requested destination.

Figure 3:
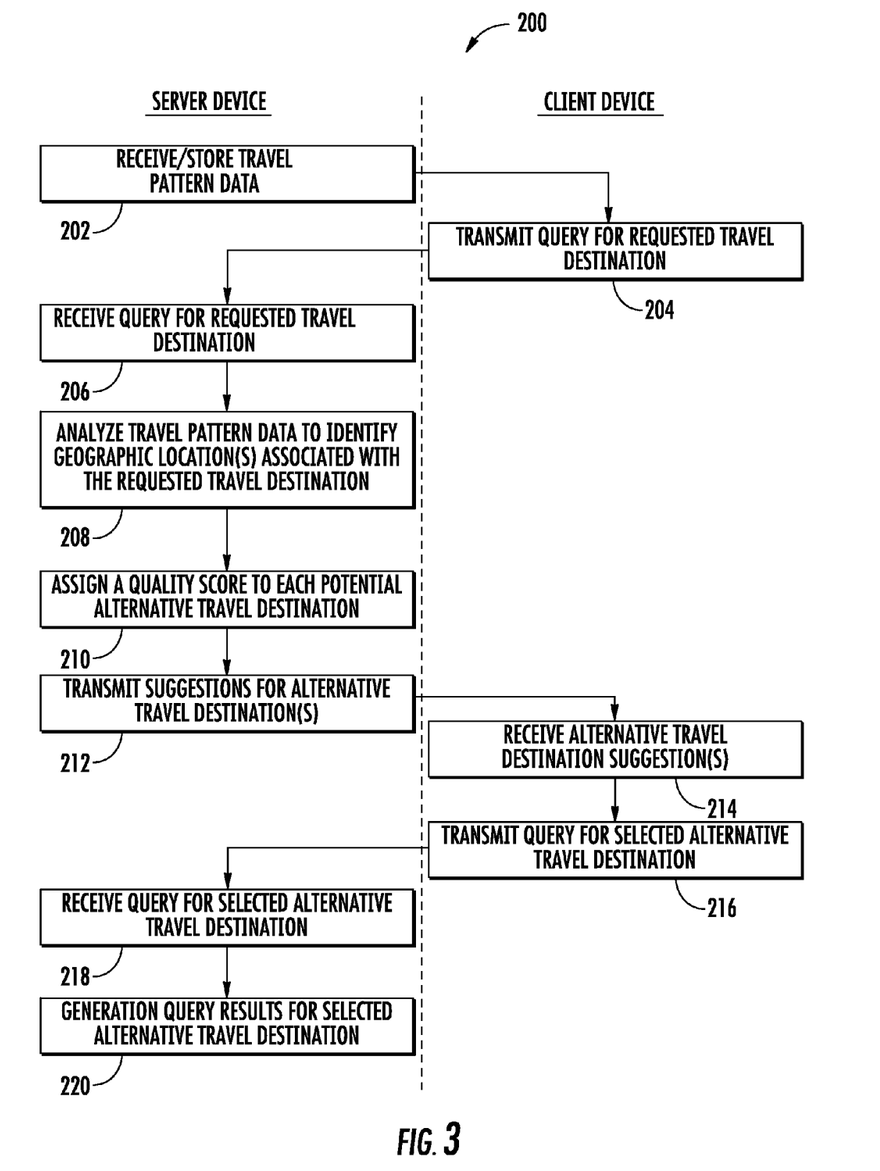
FIG. 3 illustrates a server-client flow diagram of one embodiment of a method for suggestion alternative travel destinations.

Referring now to FIG. 3, a client-server flow diagram of one embodiment of a method 200 for suggesting alternative travel destinations is illustrated in accordance with aspects of the present subject matter. The method 200 will generally be discussed herein with reference to the system 100 shown in FIG. 2. However, those of ordinary skill in the art, using the disclosures provided herein, should appreciate that the methods described herein may be executed by any computing device or any combination of computing devices. For instance, the methodology described herein may be performed entirely on a computing device associated with the user, such as a user's mobile device. Additionally, it should be appreciated that, although the method elements 202-220 are shown in FIG. 3 in a specific order, the various elements of the disclosed method 200 may generally be performed in any suitable order that is consistent with the disclosure provided herein. For instance, as will be described below, the travel pattern data may be continuously analyzed to identify suitable alternative travel destinations and/or to assign quality scores to such destinations and, thus, such method elements (208 and 210) may be performed at any suitable time, including prior to and/or after receiving a suitable query from a client device.

As shown in FIG. 3, at 202, travel pattern data may be received within and/or stored onto a server device, such as the computing device 130. For example, as indicated above, a location-enabled client device (e.g., computing device 110) may be configured to transmit location information corresponding to its current geographic location to the server device. Of particular relevance, for a client device that has requested driving directions to a given travel destination, the server device may be configured to collect location information that provides an indication of the actual route taken by the user, as well as the final driving destination of the user. Thus, by crowdsourcing such location information from a plurality of different client devices (e.g., computing devices 110, 160, 162, 164), the actual travel patterns of users requesting driving directions to the same travel destination may be collected and stored within the server device.

By receiving and/or storing such travel pattern data, the server device may be configured to suggest alternative destinations to users requesting travel directions to a given travel destination. For instance, as shown in FIG. 3, at 204, a user of a client device may transmit a query to the server device related to a requested travel destination. This query may, for example, be a search query for the requested travel destination, a query for driving directions to the requested travel destination or any other suitable query. The server device may, at 206, receive the user's query and, at 208, may analyze the stored travel pattern data to identify one or more geographic locations associated with the requested travel destination. Specifically, the server device may be configured to analyze the travel pattern data to identify the actual travel pattern(s) of a previous user(s) (including past data from the current user) that requested driving directions to the same travel destination. For example, as indicated above, the travel pattern data may allow the server device to identify the final driving destination(s) of a user(s) that previously requested driving directions to such travel destination. If the travel pattern data indicates that the user's final driving destination differed from the requested destination, the geographic location of such final driving destination may be identified as a potential alternative travel destination for the requested destination.

It should be appreciated that, when analyzing the travel pattern data, a variety of different indicators or criteria may be utilized to determine when a user has reached his/her final driving destination after requesting directions to a given travel destination. For example, it has been found that users often terminate their navigation applications and/or turn off their navigation devices upon arrival at their final driving destination. In such instances, the geographic location of the client device (as determined by the location information transmitted from such device) immediately prior to the navigation application being terminated and/or the device being shutdown may be assumed to be the final driving destination of the user. Thus, in the example shown in FIG. 1, the user's navigation application may have been terminated after reaching his/her final driving destination 14, thereby providing an indication that the user completed his/her driving journey at destination 14 instead of at the requested destination 12.

Alternatively, changes (or a lack thereof) in the travel pattern data over time may be used to estimate when a user has arrived at his/her final driving destination. For example, if the travel pattern data indicates that the user has remained at the same location for an elongated period of time, it may be determined that the user has arrived at his/her final driving destination. Similarly, the user's travel velocity may also be indicative of the user reaching his/her final driving destination. For example, if the data indicates that the user's travel velocity suddenly decreased from a speed associated with driving (e.g., greater than 5 or 10 miles per hour) to a speed associated with walking (e.g., less than 5 miles per hour), it may be assumed that the user has exited his/her vehicle. In such instance, the location at which the user's travel velocity suddenly decreased may be identified as the final driving destination for the user.

It should also be appreciated that, in addition to analyzing the travel pattern data, various other factors or criteria may also be used to identify potential alternative travel destinations. For example, a geographic location(s) may also be identified as a potential alternative travel destination(s) based on its proximity to the requested travel destination (regardless of whether previous users have traveled to such geographic location(s)). For instance, in one embodiment, all businesses (e.g., restaurants, shops, etc.), potential parking areas and/or other points-of-interest (e.g., user-defined points-of-interest) located within a given distance of the requested travel destination may be identified as potential alternative travel destinations. In another embodiment, any points-of-interest that are within a given distance from the requested travel destination and that also share a common feature with or have similar characteristics to the requested travel destination may be identified as potential alternative travel destinations.

Moreover, a geographic location(s) may also be identified as a potential alternative travel destination(s) based on a recognized affiliation or association between the geographic location(s) and the requested travel destination. Such an affiliation or association may be stored on the server device and may be derived from any source that provides a link or connection between a given location and the requested travel destination. For example, a business, such as a hotel or restaurant, may provide recommendations or other suitable information (e.g., via its website) linking the business to geographic locations that differ from the actual geographic location of the business, such as the locations of available parking lots/garages, the locations of recommended tourists sites in the area or any other suitable locations. In such instance, the affiliated or associated locations provided by the business may be stored on the server device and identified as potential alternative travel destinations for users requesting driving directions to such business. Similarly, recognized affiliations or associations may also be provided directly from users of the disclosed system 100. For example, a user may be provided with the option (via a suitable user interface) to recommend or identify specific locations as potential alternative travel destinations for other users requesting travel directions to a given travel destination.

After identifying the geographic location(s) associated with the requested travel destination, at 210, a quality score may be assigned to each potential alternative travel destination. In general, the quality score for each alternative travel destination may correspond to an assessment of the likelihood that the current user may be interested in traveling to or otherwise receiving query results for such destination as opposed to the requested travel destination. As such, when a large number of potential alternative travel destinations have been identified for the requested travel destination, the quality scores may be analyzed to determine the manner in which the destination(s) are suggested to the user.

It should be appreciated that any number of different factors and/or criteria may be utilized to assign a quality score to a particular alternative travel destination. For example, in several embodiments, the quality score may be based at least in part on the frequency at which users travel to the alternative travel destination. In one embodiment, this frequency may be determined based on the number of instances at which users traveled to the alternative travel destination after requesting driving directions to the requested travel destination. For instance, in the example shown in FIG. 1, the number of instances at which users traveled to destination 14 after requesting driving directions to destination 12 may be analyzed and used assign a quality score to destination 14. Alternatively, the frequency may be determined based on the total number of instances at which users traveled to the alternative travel destination regardless of the requested travel destination. For instance, referring again to the example shown in FIG. 1, if the travel pattern data indicates that users frequently travel to destination 14 regardless of whether they requested driving directions to destination 12 or to any other destination within the area, such destination 14 may be identified as a suitable alternative travel destination for users requesting driving directions to destinations within the area and, thus, may be scored appropriately.

Additionally, the quality score may also be user-dependent. Specifically, in several embodiments, the quality score assigned to an alternative travel destination may depend on the association or relationship of the current user (i.e., the user of the client device that transmitted the current query (204)) with the user(s) from which the travel pattern data was derived in order to initially identify the alternative travel destination. For example, an alternative travel destination that has been identified based on travel pattern data derived from the current user may be scored higher (or lower depending on the user's settings) than alternative travel destinations that have been identified based on travel pattern data derived from other users. Similarly, travel pattern data derived from users that are similar to the current user (e.g., a group of users that are about the same age or that share similar interests to that of the current user) or that have some recognized relationship with the current user (e.g., users identified as "friends" of the current user) may be scored higher (or lower depending on the user's settings) than alternative travel destinations that have been identified based on travel pattern data derived from dissimilar or unrelated users.

Moreover, the quality score may also be location-dependent. Specifically, in several embodiments, the quality score assigned to an alternative travel destination may be based at least in part on the proximity of such destination to the requested travel destination. For example, alternative travel destinations that are closer to the requested travel destination may be scored higher (or lower depending on the user's settings) than alternative travel destinations that are further away from the requested travel destination.

In addition, the quality score assigned to an alternative travel destination may also be time-dependent and/or date-dependent. For instance, the travel pattern data may indicate that users requesting driving directions to the requested travel destination often travel to a first alternative travel destination during certain time periods (e.g., in the morning) and to a second alternative travel destination during other time periods (e.g., at night). In such instance, the first alternative travel destination may be scored higher (or lower depending on the user's settings) than the second alternative travel destination in the morning while the second alternative travel destination may be scored higher (or lower depending on the user's settings) than the first alternative travel destination at night. Similarly, the travel pattern data may indicate that users requesting driving directions to the requested travel destination often travel to a first alternative travel destination on certain days (e.g., weekdays) and to a second alternative travel destination on other days (e.g., on weekends or on holidays). In such instance, the first alternative travel destination may be score higher (or lower depending on the user's settings) than the second alternative travel destination on weekdays while the second alternative travel destination may be score higher (or lower depending on the user's settings) than the first alternative travel destination on weekends or holidays.

It should be appreciated that various other suitable factors and/or criteria may also be used to assign a quality score to each potential alternative travel destination. Specifically, as another example, the quality score may depend on whether an alternative travel destination was identified as such based on travel pattern data or on a recognized affiliation/association between the alternative travel destination and the requested travel destination. For instance, given the identified connection between the two destinations, an alternative travel destination that has been identified based on recognized affiliation/association may be scored higher (or lower depending on the user's settings) than an alternative travel destination that has been identified based solely on travel pattern data. As yet another example, the quality score may depend on user-based input selections. For instance, as will be described below with reference to FIG. 4, a user may be provided with multiple options for alternative travel destinations displayed on a suitable user interface. Thus, in several embodiments, the user's input selection may be used as a signal or factor for determining the quality score of one or more of the alternative destinations (e.g., by scoring selected destinations higher than non-selected destinations).

It should also be appreciated that any combination of the above-described factors/criteria (e.g., the frequency, user-dependent, location-dependent, time-dependent, date-dependent or affiliation/association factors/criteria) may be utilized to assign quality scores to the alternative travel destinations. For instance, in one embodiment, each factor/criteria may be given a certain weight depending on predetermined settings and/or user-defined settings. Alternatively, a suitable machine learning technique may be implemented to determine which combination of factors/criteria should be used to most accurately assess each potential alternative travel destination. For instance, a recent publication entitled "Large Scale Online Learning of Image Similarity Through Ranking" (Chechik et al) describes one example of a suitable learning algorithm and methodology that may be utilized to determine how to combine the various factors/criteria in the most effective and efficient manner.

Additionally, it should be appreciated that, for purposes of discussion, method elements 208 and 210 have been shown in FIG. 3 as being performed by the server device in response to receiving a query for a specific travel destination (206). However, one of ordinary skill in the art should readily appreciate that the server device may be configured to continuously process and/or analyze the travel pattern data and, thus, may continuously update the alternative travel destination data. For instance, upon the receipt of travel pattern data, the data may be organized according to the requested travel destination and, if necessary, the list of potential alternative travel destinations for such travel destination, as well as the quality scores for such alternative destinations, may be updated based on the new travel pattern data. Thus, when a user submits a query for a given travel destination, the server device may simply call-up the alternative travel destination(s) identified for such travel destination and, if necessary, adjust the quality score(s) for such alternative destination(s) based on any user-specific factors/criteria that are used in determining the quality score(s).

Referring still to FIG. 3, at 212, the server device may suggest the potential alternative travel destination(s) to the user (210). For example, the server device may be configured to transmit data associated with the alternative travel destination(s) to the client device for subsequent presentation to the user (e.g., via display 120 (FIG. 2)). In several embodiments, the server device may be configured to transmit the alternative travel destination suggestions(s) to the client device based on the quality score(s) assigned to the destination(s). For example, in one embodiment, the server device may be configured to only transmit suggestions for alternative travel destinations that have been assigned a quality score above a predetermined threshold. In another embodiment, the server device may be configured to transmit the suggestions for alternative travel destinations in a particular order or in specific categories based on their quality scores. Alternatively, the server device may simply be configured to transmit the alternative travel destinations to the client device along with their corresponding quality scores so that the client device may subsequently filter, sort and/or otherwise process the suggestions based on their scores.

Figure 4:
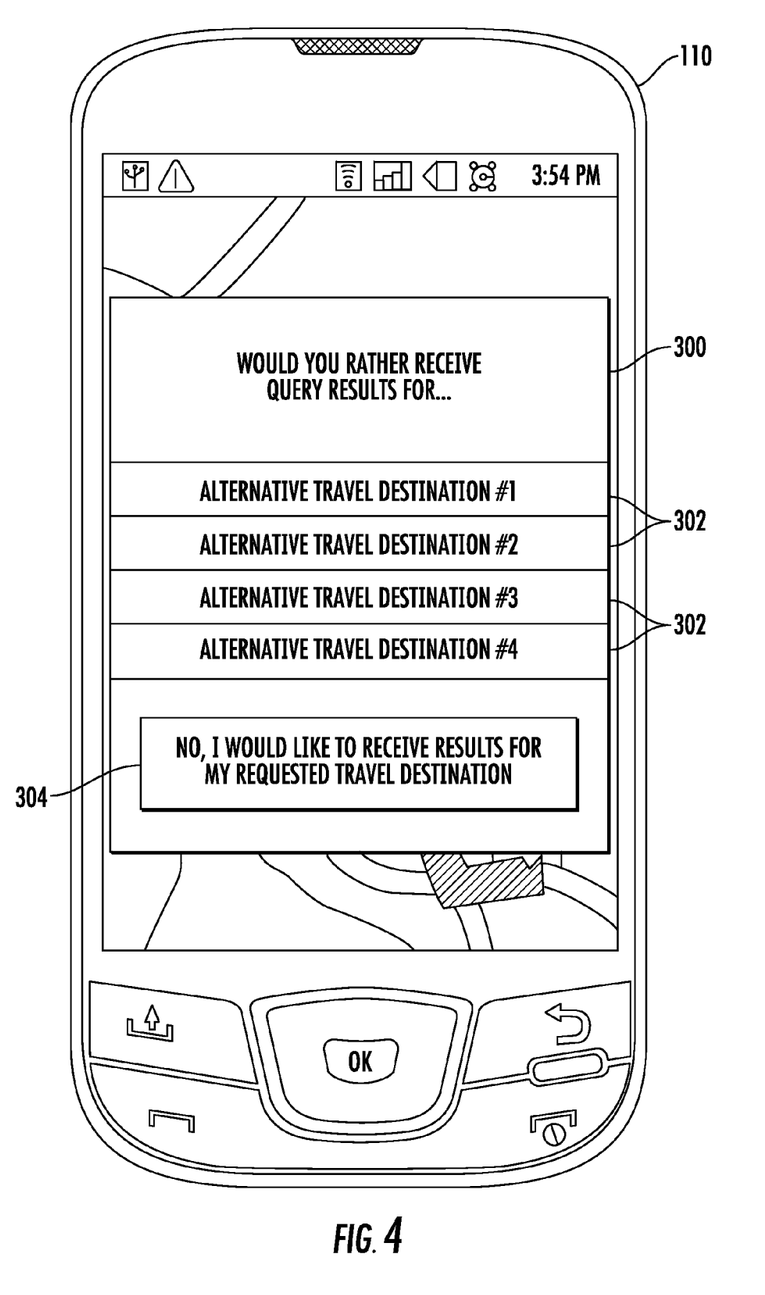
FIG. 4 illustrates an example of a user interface that may be utilized to display suggested alternative travel destinations on a client device of the user.

At 214, the alternative travel destination suggestion(s) transmitted by the server device may be received by the client device and subsequently presented to the user. For example, FIG. 4 illustrates an example user interface 300 that may be utilized to display the alternative travel destination suggestions on a client device of the user (e.g., computing device 110). As shown, in response to the user submitting a query related to a specific travel destination, a plurality of alternative travel destinations may be presented to the user in the form of selectable interface elements 302 (e.g., with the elements 302 ordered randomly or according to their quality scores). By selecting one of the alternative travel destinations, the user may indicate that, instead of receiving query results for the requested travel directions, he/she would rather receive query results for the selected destination. In addition, as shown in FIG. 4, a selectable interface element 304 may also be presented to allow the user to confirm that he/she would like to receive the query results for the previously requested travel destination.

Referring back to FIG. 3, assuming that the user selected one of the alternative travel destinations, the client device may, at 216, transmit a query related to the selected destination. Additionally, at 218 and 220, the server device may receive the query and subsequently generate appropriate query results. For example, if the query transmitted by the client device requests driving directions to the selected alternative travel destination, the server device may generate a driving route for traveling from the user's current location (or from another point or origin) to the selected alternative travel destination. Thereafter, the routing information may be transmitted to the user's client device and presented to the user. Alternatively, in embodiments in which the client device is configured to generate its own driving route, the route may be generated by the client device upon selection by the user of one of the alternative travel destinations.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A system for suggesting alternative travel destinations, the system comprising:

a computing device including a processor and memory, the memory storing instructions that, when executed by the processor, configure the computing device to:
  collect travel pattern data from a plurality of first users that requested travel directions to a requested travel destination, the requested travel destination being at a first geographic location;
  receive a query from a client device of a second user associated with the requested travel destination;
  analyze the travel pattern data for the plurality of first users to identify at least one second geographic location that is associated with the requested travel destination, the travel pattern data including information associated with a location of one or more of the plurality of first users after requesting the travel directions; and
  transmit to the client device of the second user a suggestion for at least one alternative travel destination based on the at least one second geographic location.

2. The system of claim 1, wherein the at least one second geographic location corresponds to a final driving destination of one or more of the plurality of first users after requesting travel directions to the requested travel destination.

3. The system of claim 1, wherein the memory stores instructions that, when implemented by the processor, further configure the computing device to assign a quality score to the at least one second geographic location.

4. The system of claim 3, wherein the quality score is based at least in part on a frequency at which one or more of the plurality of first users traveled to the at least one second geographic location.

5. The system of claim 3, wherein the frequency corresponds to at least one of a number of instances that one or more of the plurality of first users traveled to the at least one second geographic location after requesting travel directions to the requested travel destination or a total number of instances that one or more of the plurality of first users traveled to the at least one second geographic location regardless of the requested travel destination.

6. The system of claim 3, wherein the quality score is based at least in part on an association of one or more of the plurality of first users to the second user.

7. The system of claim 3, wherein the quality score is based at least in part on at least one of a time period or a date when one or more of the plurality of first users traveled to the at least one second geographic location.

8. The system of claim 3, wherein the quality score is based at least in part on a proximity of the at least one second geographic location to the requested travel destination.

9. The system of claim 3, wherein the quality score is based at least in part on a recognized affiliation or association between the at least one second geographic location and the requested travel destination.

10. A computer implemented method for suggesting alternative travel destinations, the method comprising:
  collecting, with a computing device, travel pattern data from a plurality of first users that requested travel directions to a requested travel destination, the requested travel destination being at a first geographic location;
  receiving, with the computing device, a query from a client device of a second user associated with the requested travel destination;
  analyzing, with the computing device, the travel pattern data for the plurality of first users to identify at least one second geographic location that is associated with the requested travel destination, the travel pattern data including information associated with a location of one or more of the plurality of first users after requesting the travel directions; and
  transmitting, with the computing device, to the client device of the second user a suggestion for at least one alternative travel destination based on the at least one second geographic location.

11. The method of claim 10, wherein the at least one second geographic location corresponds to a final driving destination of one or more of the plurality of first users after requesting travel directions to the requested travel destination.

12. The method of claim 10, further comprising assigning a quality score to the at least one second geographic location.

13. The method of claim 12, wherein the quality score is based at least in part on a frequency at which one or more of the plurality of first users traveled to the at least one second geographic location.

14. The method of claim 13, wherein the frequency corresponds to a number of instances that one or more of the plurality of first users traveled to the at least one second geographic location after requesting travel directions to the requested travel destination.

15. The method of claim 13, wherein the frequency corresponds to a total number of instances that one or more of the plurality of first users traveled to the at least one second geographic location regardless of the requested travel destination.

16. The method of claim 12, wherein the quality score is based at least in part on an association of one or more of the plurality of first users to the second user.

17. The method of claim 12, wherein the quality score is based at least in part on at least one of a time period or a date when one or more of the plurality of first users traveled to the at least one second geographic location.

18. The method of claim 12, wherein the quality score is based at least in part on a proximity of the at least one second geographic location to the requested travel destination.

19. The method of claim 12, wherein the quality score is based at least in part on a recognized affiliation or association between the at least one second geographic location and the requested travel destination.

20. The method of claim 12, wherein transmitting to the client device of the second user a suggestion of at least one alternative travel destination based on the at least one second geographic location comprises transmitting the suggestion of the least one alternative travel destination based on the quality score of the at least one second geographic location.

* * * * *